United States Patent
Zheng et al.

(10) Patent No.: US 7,961,433 B2
(45) Date of Patent: Jun. 14, 2011

(54) AIR-BEARING DESIGN FOR HARD DISK DRIVE (HDD) APPLICATIONS

(75) Inventors: Guoqiang Zheng, Milpitas, CA (US); Shoji Toyoda, Hong Kong (JP); Ellis Cha, San Ramon, CA (US); Zhu Feng, Pleasanton, CA (US); Collins Lee, San Francisco, CA (US)

(73) Assignee: SAE Magnetics (HK) Ltd., Shatin, N.T. (HK)

( * ) Notice: Subject to any disclaimer, the term of this patent is extended or adjusted under 35 U.S.C. 154(b) by 669 days.

(21) Appl. No.: 12/074,082

(22) Filed: Feb. 29, 2008

(65) Prior Publication Data

US 2009/0219651 A1      Sep. 3, 2009

(51) Int. Cl.
*G11B 5/60* (2006.01)
(52) U.S. Cl. ..................................... 360/236.5
(58) Field of Classification Search ................. 360/236.5
See application file for complete search history.

(56) References Cited

U.S. PATENT DOCUMENTS

| | | | |
|---|---|---|---|
| 5,853,959 A | 12/1998 | Brand et al. | |
| 6,057,983 A * | 5/2000 | Kajitani | 360/235.6 |
| 6,356,405 B1 | 3/2002 | Gui et al. | |
| 6,594,113 B2 * | 7/2003 | Rao et al. | 360/235.8 |
| 6,661,611 B1 * | 12/2003 | Sannino et al. | 360/236.3 |
| 6,661,612 B1 * | 12/2003 | Peng | 360/236.3 |
| 6,747,847 B2 | 6/2004 | Stoebe et al. | |
| 7,227,723 B2 * | 6/2007 | Nath et al. | 360/235.7 |
| 7,477,486 B1 * | 1/2009 | Sun et al. | 360/236.3 |
| 7,656,616 B2 * | 2/2010 | Matsumoto | 360/235.7 |
| 2002/0075599 A1 * | 6/2002 | Rao et al. | 360/235.7 |
| 2003/0058578 A1 * | 3/2003 | Boutaghou et al. | 360/235.8 |

* cited by examiner

*Primary Examiner* — Mark Blouin
(74) *Attorney, Agent, or Firm* — Saile Ackerman LLC; Stephen B. Ackerman

(57) ABSTRACT

A slider is formed with an ABS topography that eliminates the accumulation of lubricant swept from the surface of a rotating disk in an operating HDD. The topography includes air channeling grooves in which are formed backflow blocking elements that prevent the formation airflow patterns that would cause lubricant to be aspirated into the ABS topography of the slider and that create airflow patterns that sweep lubricant away from the ABS of the slider. The topography is first tested to make sure that the slider has the proper flying height and aerodynamic stability, then the backflow blocking elements are added to control the airflow, while maintaining the desired flying height and stability.

9 Claims, 4 Drawing Sheets

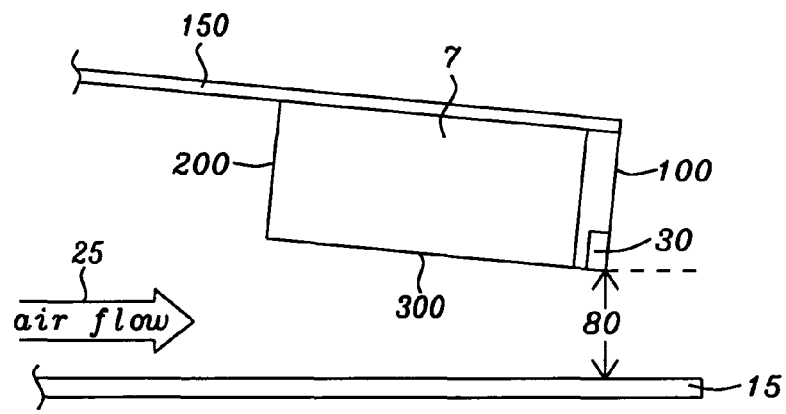
FIG. 1 – Prior Art
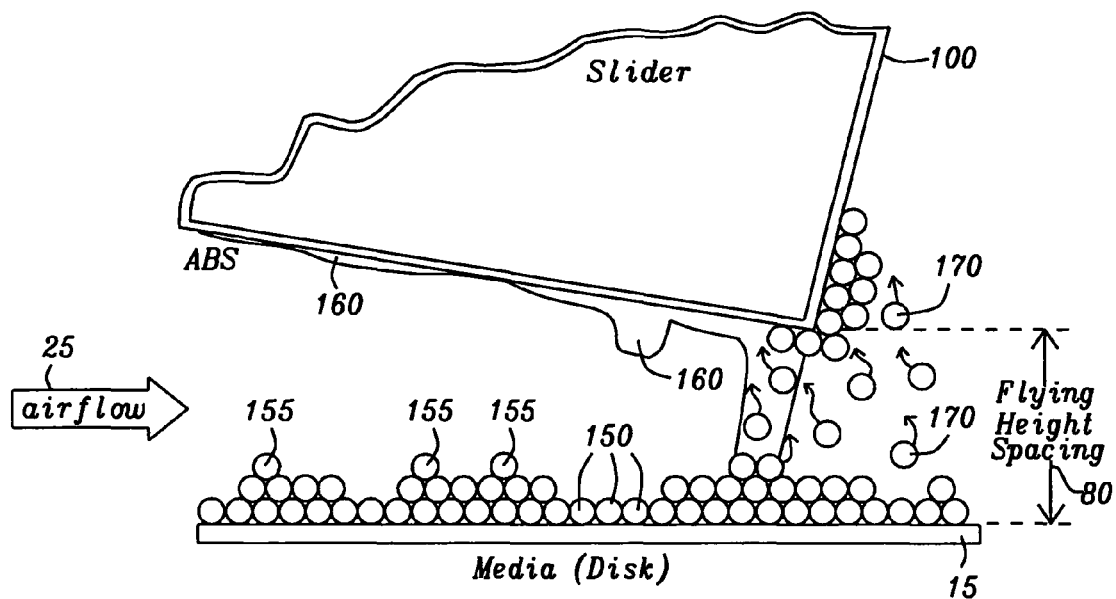
FIG. 2 – Prior Art

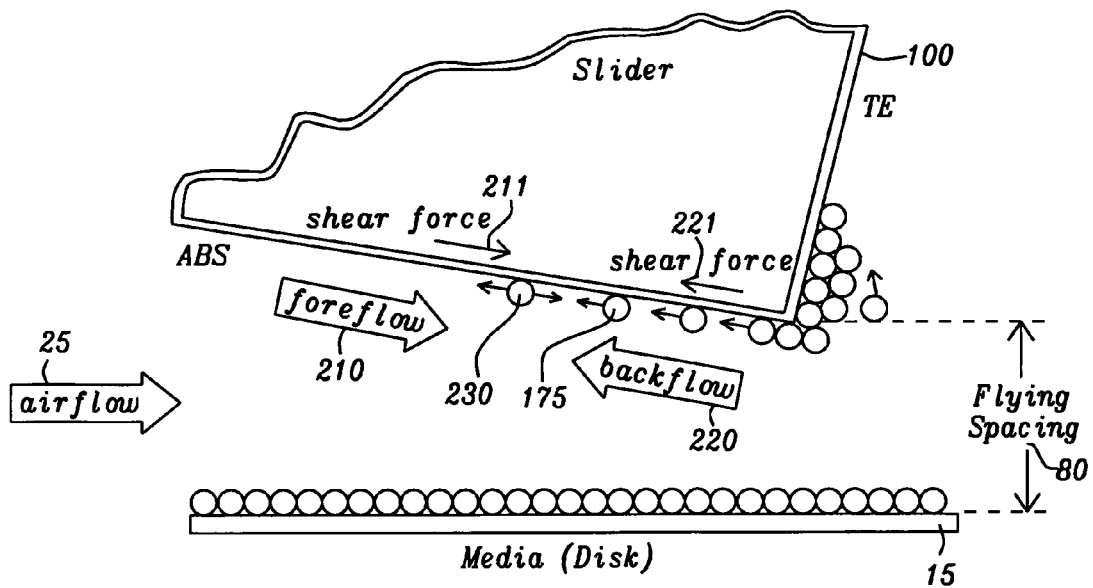
FIG. 3 – Prior Art
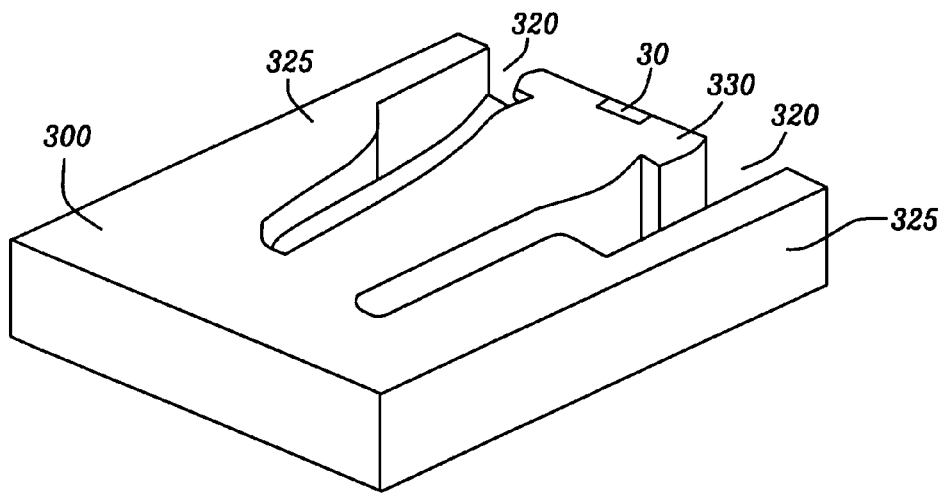
FIG. 4 – Prior Art

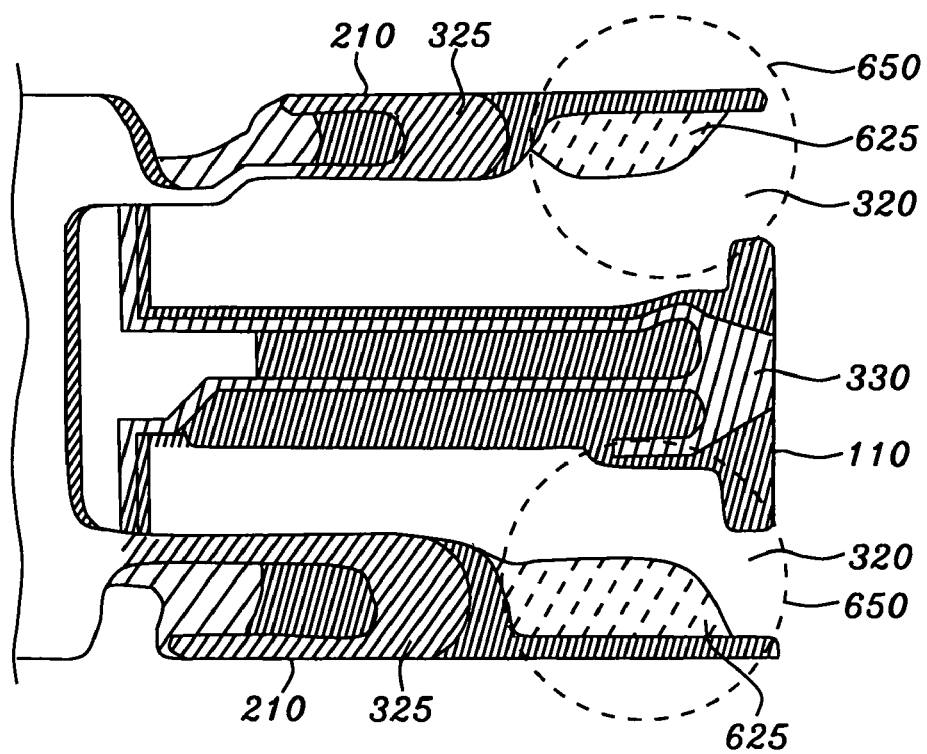
FIG. 5A – Prior Art
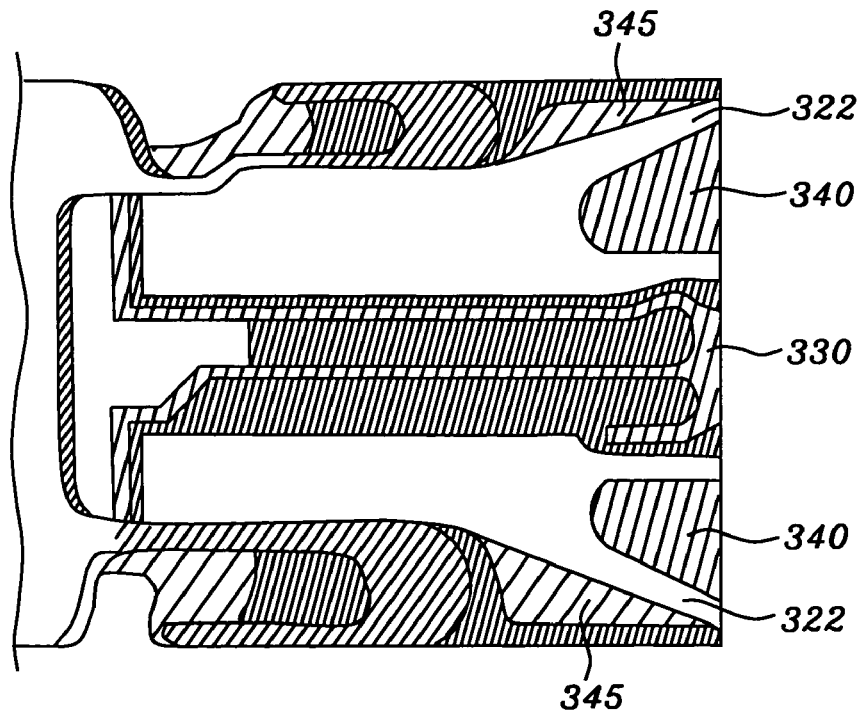
FIG. 5B

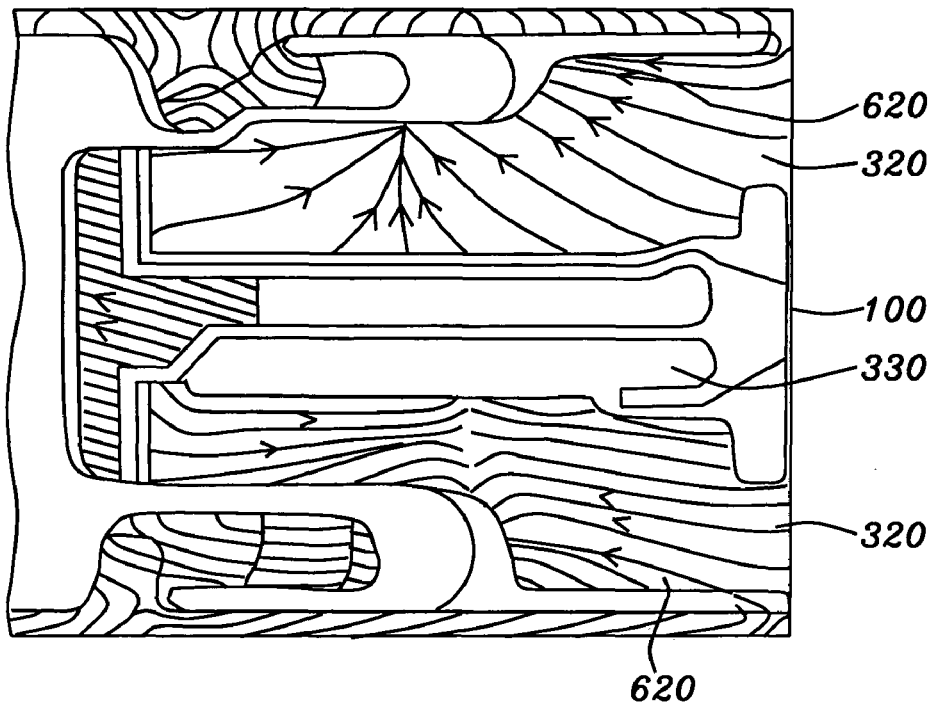
FIG. 6A – Prior Art
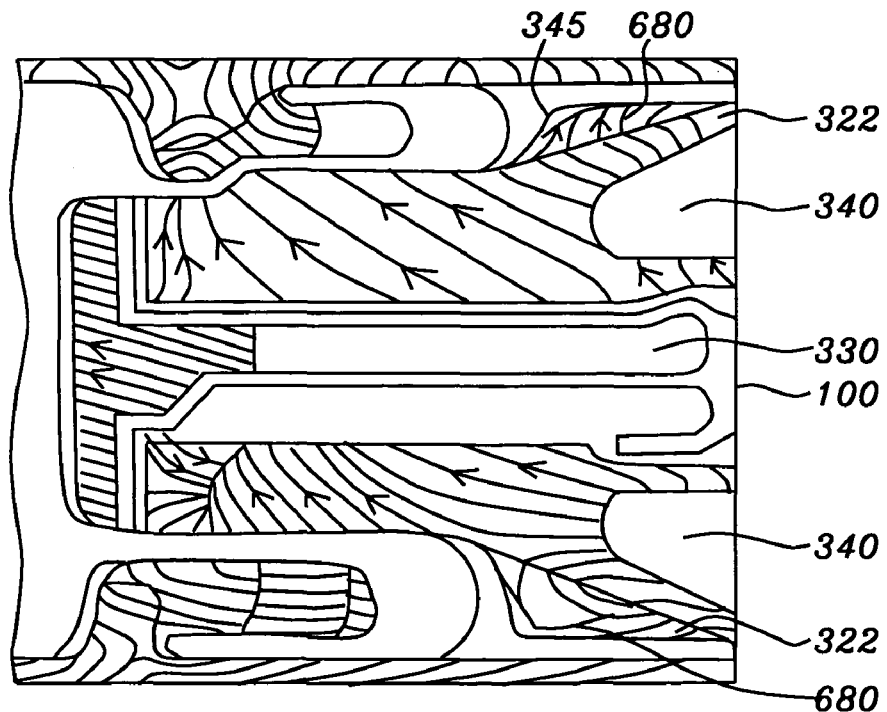
FIG. 6B

AIR-BEARING DESIGN FOR HARD DISK DRIVE (HDD) APPLICATIONS

BACKGROUND OF THE INVENTION

1. Field of the Invention

This invention relates to the fabrication of thin film magnetic read/write heads and particularly to a method for forming a slider surface so that the accumulation of lubricant during disk drive operation is reduced.

2. Description of the Related Art

Referring to schematic FIG. 1, there is shown a portion of a hard disk drive (HDD) in which an encapsulated, small thin film magnetic read/write head (30), formed on a ceramic substrate called a slider (7), is used to read and write data on a magnetic medium or storage disk (15). The read/write head (30) is formed using well known semiconductor deposition techniques such as electroplating, CVD (chemical vapor deposition) and photolithographic patterning and etching. The slider (7) has a pre-patterned air-bearing surface (ABS) typically referred to as an ABS plane (300) that faces the rotating disk (15) during HDD operation. The ABS plane (300), shown here in a side view, only defines a vertical boundary of the patterned slider ABS, because the patterning actually incises the plane to create channels for airflow. These channels will be shown in later figures and cannot be seen here. The slider is mounted on the distal end of a head gimbal assembly (HGA) (150) that is activated by an electromechanical mechanism and control circuitry to position the slider-mounted head at various positions along the magnetic tracks on the disk (not shown).

As the disk is rapidly rotated by a spindle motor (not shown), hydrodynamic pressure causes an air flow (arrow, (25)) between the patterned ABS plane (300) of the slider (7) and the surface of the disk (15). This flow lifts the slider so that it literally flies above the surface of the disk at a "fly height" (80), supported on a layer of air. This fly height is approximately 10 nm or less. The edge of the slider into which the disk rotates is called its "leading edge" (200), the opposite edge, which contains the read/write head (30), is called the "trailing edge" (100). The aerodynamics of the slider motion lifts the leading edge higher above the rotating disk surface than the trailing edge.

As disk capacities increase and there are corresponding increases of the area density of the recordings, slider flying height is made to become increasingly lower in order to achieve accurate reading and writing by the head. This reduction in flying height creates a variety of proximity interactions, such as intermolecular forces (IMF), meniscus forces and electrostatic forces (ESF). These forces and the associated influence of disk topography tend to destabilize the aerodynamic motion of the slider. In addition, evidence from various recent slider reliability tests have indicated that the interaction between the slider and lubricants on the disk surface is becoming more critical in determining the stability of the slider's flight over the disk surface. The current negative pressure ABS design has particular geometric surface features that makes the ABS more susceptible to air flow stagnation and even air flow reversal, both of which tends to cause the lubricant on the top surface of the disk to be transferred to the slider's ABS. This occurs even in the absence of any actual contact between the slider surface and the disk surface. Such lubricant transfer contaminates the slider ABS and removes the protective lubricant layer from the disk, which can prevent the slider from flying at optimum design height and further affect the reliability of the hard disk drive (HDD). Therefore, there is a need in the HDD industry to employ an ABS design that can mitigate this transfer of lubricant. The present invention provides such a mitigation of lubricant transfer.

As schematically illustrated in FIG. 2, the surface of the disk (15) is typically covered by an irregular layer of lubricant, which is indicated here as small spherical beads (150). The beads cluster irregularly into small mounds or "moguls" (155). The airflow, indicated by arrow (25), beneath the ABS of the slider creates a distribution of air pressure against the ABS, which is schematically indicated by a curve (160). There is also shown the flow of lubricant (170) to the trailing edge surface (100) of the slider. The flow of lubricant to the trailing edge surface of the slider is a result of the very high air-bearing forces that act on both the ABS of the slider (as indicated by the pressure curve) and on the distribution of lubricant on the disk surface. These forces are instrumental in forming the lubricant moguls (155) as well as the lubricant transfers (170). The detailed causes of the lubricant behavior depend on both the forces and the lubricant properties, such as molecular roughness and cohesion. With the effect of negative pressure ABS design, the majority of the lubricant transferred to the slider is sucked into a trailing air groove (not visible here, but shown as (320) in FIG. 5A) within the patterned ABS of the slider, where it accumulates and resides, because of the sub-ambient pressure within it. Lubricant can also be sheared off to the trailing air groove due to the higher shear on the ABS as it flies near the disk surface.

Referring to FIG. 3, there is schematically shown the illustration of FIG. 2 with additional details to indicate the airflow patterns along the ABS of the slider. Arrow (210) indicates "foreflow," which is surface flow along the ABS in the direction of the major airflow (arrow (25)) between the ABS and the disk surface. Arrow (220) indicates a region of "backflow" where the surface airflow is counter to the major airflow direction. These two flows also create shear forces (arrows (211), (221)) along the ABS in the two flow directions. In between these two flow regions there is a stagnation region (shown on a lubricant particle (230)) of neither airflow nor shear. As is shown in the figure, lubricant near the trailing edge (TE, (100)) tends to migrate (175) towards the stagnation region. The patterns of lubricant flow will be more clearly indicated when FIGS. 5A and 5B are discussed below.

Although attempts have been made in the prior art to mitigate the effects of lubricant accumulation, these attempts do meet the objects nor provide the properties of the present invention. In this respect, U.S. Pat. No. 7,227,723 (Nath et al) discloses streamline control elements in a recessed area and standing above the recessed area.

U.S. Pat. No. 6,747,847 (Stoebe et al) describes channels located within pads to flush accumulated lubricant.

U.S. Pat. No. 6,356,405 (Gui et al) teaches landing the head at selected stop intervals to remove accumulated lubricant.

U.S. Pat. No. 5,853,959 (Brand et al) states that the invention can create pole patterning features with complex contours to reduce lubricant accumulation, but gives no details.

SUMMARY OF THE INVENTION

The object of the present invention is to provide a slider ABS design that will eliminate the problems associated with lubricant transfer, accumulation and migration while still maintaining a stable aerodynamics. This object will be achieved as follows.

Referring now to FIG. 4, there is shown a schematic and highly simplified 3-D isometric view of the topography of a typical prior art ABS patterned design. Many features are omitted so that the salient structures can be described.

As shown in FIG. 4 the disk-facing surface of the slider can be considered as forming a virtual ABS plane (300) that bounds the ABS vertically. The intersection of this virtual ABS plane with the topography contains the physical planar surfaces of the highest features of the slider ABS. The outer edges of the slider is formed as two side rails (325) which provide aerodynamic stability to the motion of the slider over a spinning disk. The center of the slider contains a center rail (330) that contains the read/write transducer (30) at its trailing edge. Two deep air grooves (320) are formed between the center rail and the side rails. These grooves are also responsible for the aerodynamic performance of the slider. There are many shallow grooves also formed in the surface plane (300), but these are not shown in this simple representation.

The intersection of the ABS plane ((300) in FIG. 4) with the 3-D topography of the slider is shown schematically in the illustrations of FIGS. 5A and 5B, each of which offer a perspective formed by looking up at the ABS of a sliders from the surface of the disk. FIG. 5A corresponds generally with the simplified prior art slider of FIG. 4. However, it shows more of the details of the ABS topography. Note also that relative heights of topological features are represented by the density of shading. Thus, the densest shaded portions are actually intersecting the ABS plane, while regions without any shading represent the lowest surfaces (floors) of the deep air grooves.

The intersection of the ABS plane with the slider topography creates a substantially rectangular outer perimeter. One edge of this perimeter will be designated the trailing edge (110), because it is contained in the trailing edge plane ((100) in FIG. 1) of the slider. A pair of parallel edges of this perimeter (210), that are perpendicular to the trailing edge, are partially formed by the outer edges of side rails (325) of the slider.

As can be seen, the topography of each slider includes one or more shallow recesses (315) and two deep air grooves (320), incised through the ABS plane (300). Referring again to FIG. 5A, the deep air grooves (320) are symmetrically disposed about a center rail (330) that partially forms the inner walls of the grooves and at whose trailing edge (110) the transducer element is embedded (not shown). The grooves extend vertically downward to form a bottom surface (unshaded) that is substantially parallel to the ABS plane. The outer wall of each deep air groove is an inner wall of a side rail (325) of the slider. The inner sidewalls of each groove form the outer walls of the center rail (330). The side rails of the slider, together with its center rail are largely responsible for its aerodynamic performance.

Two circles (650) indicate regions on the bottom surface of the deep air grooves, abutting the outer walls of the grooves, within which accumulations of lubricant (shaded areas (625) within the circles (650)) are found after the HDD is run.

Unlike the prior art slider in FIG. 5A, the slider of the present invention, shown in FIG. 5B, does not exhibit regions of accumulated lubricant after periods of operation. The topological structure of the slider of FIG. 5B, also includes two raised trapezoidal pads (340) at the trailing edge of the slider, symmetrically disposed about the center rail and approximately in the middle of the deep air grooves ((320) in FIG. 5A). As indicated by their shading, they rise substantially to the height of the ABS plane. There are also two triangular pads (345) recessed within notches formed in the side rails ((325) in FIG. 5A). These pads are shown (by their shading) as being lower in height than the trapezoidal pads (340). As will be seen, these trapezoidal and triangular pads influence the airflow during HDD operation and help to eliminate regions of flow stagnation where lubricant accumulation occurs.

During the operation of the HDD the disk rotates at an essentially constant angular velocity to generate the positive and negative air pressures and to form an air-bearing layer between the slider and disk that supports the slider slightly above the disk surface. The flow of air within the slider ABS topography controls the accumulation of lubricant.

Referring now to FIG. 6A, there is schematically shown the same view of the topology of sliders as in FIG. 5A, except there are now included lines of airflow (curved lines with directional arrows) corresponding to the flow of air within the topology while the slider is flying over the spinning disk in an operating HDD. For clarity, the shading of the previous figures has been omitted. Note the strong flow of air (backflow) into the trailing edge openings of the deep air grooves (320) in FIG. 6A as indicated by the streamlines. Unfortunately, in order to achieve an optimal, stable, aerodynamic performance of the slider, current ABS designs have particular geometric and topographic features (e.g. the outer rails and the deep air grooves) that make them susceptible to airflow stagnation and even to airflow reversals, both of which can lead to the undesirable accumulation of lubrication as discussed above and shown in FIG. 5A.

The lines of airflow can offer an explanation for the regions of lubricant accumulation shown as (625) in FIG. 5A. Note in FIG. 6A, the two regions (620) where the airflow lines strike the interior vertical sides of the side rails ((325) in FIG. 5A). These correspond to the circled regions (650) shown in FIG. 5A at which lubricant was actually found to accumulate during reliability testing operations of the slider. Microphotographs of the interior surfaces of the slider, from which the schematic illustration of FIG. 5A are made, consistently show accumulated lubricant in precisely these regions. We shall see that the airflow pattern of the present invention slider in FIG. 5B eliminates such regions of lubricant accumulation.

BRIEF DESCRIPTION OF THE DRAWINGS

The objects, features, and advantages of the present invention are understood within the context of the Description of the Preferred Embodiment as set forth below.

The Description of the Preferred Embodiment is understood within the context of the accompanying figures, wherein:

FIG. 1 is a schematic side-view drawing showing the features of a typical slider that is in aerodynamic motion over as rotating disk.

FIG. 2 is a schematic side-view drawing showing the slider of FIG. 1 flying above a lubricated disk, showing the transfer of lubricant to the slider.

FIG. 3 is a schematic side-view showing the migration paths of lubricant over the ABS of the slider of FIG. 1.

FIG. 4 is a schematic 3-D isometric view of the surface topography of a typical prior art slider.

FIG. 5A is a schematic view of the ABS of the prior art slider of FIG. 4, denoted "slider A", looking up from a disk surface, showing topological features of the slider and pointing out regions at which lubricant accumulates during HDD operation. The density of shading denotes the height (denser=higher) of a feature in this figure and the following FIG. 5B.

FIG. 5B is a schematic view of the ABS of the slider of the present invention, denoted "slider B," looking up from a disk surface, showing topological features of the slider and indicating that there are no regions at which lubricant accumulates during HDD operation.

FIG. 6A is a schematic view of the prior art slider of FIG. 4 but lacks shading for clarity. It is otherwise identical to the illustration of FIG. 5A, but also shows airstream patterns formed within the slider topography during HDD operation.

FIG. 6B is a schematic view of the slider of the present invention and, with the exception of shading, is otherwise identical to the illustration of FIG. 5B, but also shows airstream patterns formed within the slider topography during HDD operation.

DESCRIPTION OF THE PREFERRED EMBODIMENTS

The preferred embodiment of the present invention is an aerodynamically stable slider, preferably designed in the form of the slider in FIG. 5B, having an ABS topography that eliminates the accumulation of lubricant collected from the surface of a rotating disk, while still maintaining the proper flying height and aerodynamic stability of the slider.

Comparing the design of the slider shown schematically in FIG. 5B with that of the slider shown schematically in FIG. 5A, several important feature differences are to be noted. First, referring to FIG. 5B, there can be seen a pair of raised trapezoidal pads (340) positioned at the trailing edge of the deep air grooves ((320) in FIG. 5A). The grooves and the pads are symmetrically disposed about the center rail (330). There are also two triangular pads (345) formed within notches on the side rails ((325) in FIG. 5A).

The thickness (height) of these pads can be adjusted so as to maintain good aerodynamic stability of the slider, while controlling the flow and accumulation of lubricant. These pads, (340) and (345), are called "backflow blockers," because they prevent the strong airflow reversals at the trailing edge of the slider that brings air, along with lubricant, into the grooves (320) in FIG. 5A. Instead, the backflow blockers produce a flow in the narrower channels (322) shown in FIG. 6B that would both diminish the backflow tending to bring lubricant into the slider, eliminate regions of flow stagnation and also to establish airflow patterns that tend to carry any transferred lubricant out from within the slider topography. Note, in particular, the airflow pattern (680) against the inner wall surface of the side rails that bounds the triangular pads (345). This airflow tends to sweep towards the trailing edge and would carry any lubricant out of the slider, preventing its accumulation.

Note also that the backflow blockers (340) can be isolated (single) or can be joint (a pair) as in the present case. A blocker can have any height above the base of the recessed area as long as it is capable of reversing the airflow into the slider. A height less than approximately 5 microns was suitable for the preferred embodiment described here. The shape of the blocker is also quite general as long as it fits into the air groove at the trailing edge of the slider. Once the ABS of the slider has been designed to meet the aerodynamic criteria of the slider (such as would be the case for prior art slider of FIG. 5A), properly shaped backflow blockers can be added to the slider at proper positions to eliminate the lubricant accumulation. It is conceivable that the process of controlling the lubricant accumulation while maintaining the aerodynamic stability of the slider may require a process of successive iterations, wherein the stability is first ascertained before any blocking elements have been formed, then the blocking elements are formed by etching and the stability is once again measured and so on until a desired end result is achieved. For example, both the side rails ((325) in FIG. 5A) and the backflow blockers ((340) in FIG. 5B) can be formed at the same time by an etching process applied to the ABS of the slider. Since the blockers do not affect the flying height of the slider, an ABS design can first be structured to provide the proper flying height and aerodynamic stability, then the design can be modified by etching to form the blockers.

As is understood by a person skilled in the art, the preferred embodiment of the present invention is illustrative of the present invention rather than being limiting of the present invention. Revisions and modifications may be made to methods, processes, materials, structures, and dimensions through which is formed a slider having an ABS topography that provides proper flying height and aerodynamic stability and eliminates the accumulation of lubricant during hard disk drive operation, while still providing such a slider, formed in accord with the present invention as defined by the appended claims.

What is claimed is:

1. An aerodynamically stable slider that minimizes the accumulation of lubricant during operation of a HDD, said slider comprising:

an ABS plane that faces a lubricated surface of a rotatable disk and has a topography formed of 3-dimensional topographical features; whereby a moving layer of air is formed between said topographical features of said ABS plane and said lubricated disk surface during rotation of said disk; and wherein said topography comprises:

a substantially rectangular perimeter, wherein a trailing edge of said perimeter is an intersection of a trailing edge plane of said slider with said ABS plane; and a pair of substantially parallel side rails whose outer edges form parallel edges of said ABS rectangular perimeter that are perpendicular to said trailing edge plane;

a pair of symmetrically disposed, parallel deep air grooves formed in said ABS plane and extending perpendicularly from said trailing edge plane, wherein each of said pair of grooves forms an opening at said trailing edge plane and wherein each of said grooves is directed towards a leading edge of said slider and wherein each of said grooves terminates before reaching said leading edge, and wherein each of said grooves has a bottom surface that is at a uniform depth below said ABS plane; and wherein each of said grooves has substantially parallel, vertical inner and outer sidewalls of equal height, wherein said inner sidewalls of each said groove are closest to each other and wherein each of said pair of outer sidewalls forms an inner sidewall of said side rails; and a triangular pad recessed within each of said inner sidewalls of said side rails;

a central rail formed by the region between said inner sidewalls of said air channeling grooves, a transducer element being embedded in a trailing edge of said rail, wherein vertical sidewalls of said rail are formed by the inner sidewalls of said grooves; and wherein backflow blocking elements are formed within said grooves where said grooves intersect said trailing edge plane, whereby said airflow pattern produces a stable aerodynamic slider performance; and said airflow pattern carries any lubricant removed from said lubricated disk away from said ABS topography and whereby there is no accumulation of lubricant formed within said topography.

2. The slider of claim 1 wherein said backflow blocking elements eliminate patterns of airflow that would carry lubricant into said ABS topography.

3. The slider of claim 1 wherein said backflow blocking elements and said recessed triangular pads create patterns of airflow that would carry any lubricant away from within the ABS topography and would also eliminate regions of airflow stagnation where lubricant accumulation could occur.

4. The slider of claim 1 wherein said backflow blocking elements are geometric forms that extend vertically upward from said lower surface of said air channeling grooves to a height that is at or below the level of said ABS plane.

5. The slider of claim 1 wherein said backflow blocking elements are geometric forms formed between the sidewalls of said grooves.

6. The slider of claim 4 wherein said backflow blocking elements are substantially trapezoidal in shape and are formed in each air channeling groove at a position between said central rail and said outer sidewall of said groove at the trailing edge of the slider.

7. The slider of claim 5 wherein said backflow blocking elements are triangular in shape.

8. The slider of claim 4 wherein said backflow blocking elements are less than approximately 5 microns in height.

9. The slider of claim 1 wherein the slider has been tested for continued aerodynamic stability after the addition of said backflow blocking elements.

* * * * *

UNITED STATES PATENT AND TRADEMARK OFFICE
CERTIFICATE OF CORRECTION

PATENT NO. : 7,961,433 B2  Page 1 of 1
APPLICATION NO. : 12/074082
DATED : June 14, 2011
INVENTOR(S) : Zheng et al.

It is certified that error appears in the above-identified patent and that said Letters Patent is hereby corrected as shown below:

On the title page item (75), should read: "Shoji Toyoda, Hong Kong, (HK)".

Signed and Sealed this
First Day of November, 2011

David J. Kappos
*Director of the United States Patent and Trademark Office*